(12) United States Patent
Koehler

(10) Patent No.: US 11,454,156 B2
(45) Date of Patent: Sep. 27, 2022

(54) EXHAUST CLAMP AND METHOD

(71) Applicant: Ideal Clamp Products, Inc., Smyrna, TN (US)

(72) Inventor: Edwin T. Koehler, Smyrna, TN (US)

(73) Assignee: Ideal Clamp Products, Inc., Smyrna, TN (US)

( * ) Notice: Subject to any disclaimer, the term of this patent is extended or adjusted under 35 U.S.C. 154(b) by 586 days.

(21) Appl. No.: 16/481,611

(22) PCT Filed: Jan. 30, 2018

(86) PCT No.: PCT/US2018/015855
§ 371 (c)(1),
(2) Date: Jul. 29, 2019

(87) PCT Pub. No.: WO2018/140916
PCT Pub. Date: Aug. 2, 2018

(65) Prior Publication Data
US 2019/0390590 A1 Dec. 26, 2019

Related U.S. Application Data

(60) Provisional application No. 62/451,886, filed on Jan. 30, 2017.

(51) Int. Cl.
*F01N 13/18* (2010.01)
*F16L 23/00* (2006.01)
(Continued)

(52) U.S. Cl.
CPC ........ *F01N 13/1844* (2013.01); *F16L 23/003* (2013.01); *F16L 23/08* (2013.01);
(Continued)

(58) Field of Classification Search
CPC ............... F01N 13/1844; F01N 13/185; F01N 2450/18; F01N 2450/20; F16L 23/003; F16L 23/08
See application file for complete search history.

(56) References Cited

U.S. PATENT DOCUMENTS 2,663,582 A 12/1953 Sebok
5,782,499 A * 7/1998 Gfrerer .................. F16L 23/08
285/23

(Continued)

FOREIGN PATENT DOCUMENTS

CN 103069204 A 4/2013
CN 203322568 U 12/2013
(Continued)

OTHER PUBLICATIONS

European Search Report for related EP 18745266, dated Oct. 1, 2020, 7 pages.
(Continued)

*Primary Examiner* — Jonathan R Matthias
(74) *Attorney, Agent, or Firm* — Barnes & Thornburg LLP

(57) ABSTRACT

An assembly is provided including a clamp comprising a band having an annular groove defined therein. The annular groove is defined between a pair of curved band surface sections joined to a substantially flat band surface section when the clamp is viewed in cross-section. The assembly also includes a substantially cylindrical body having an axis. A flared flange extends radially outwardly from the cylindrical body. A retaining clip extends from the flared flange. The band clamp is secured to the conduit such that the flared flange of the conduit is positioned within the band, and the retaining clip of the conduit is secured to the band.

25 Claims, 12 Drawing Sheets

(51) Int. Cl.
*F16L 23/08* (2006.01)
*F16L 21/06* (2006.01)
*F16L 23/04* (2006.01)

(52) U.S. Cl.
CPC ...... *F01N 2450/18* (2013.01); *F01N 2450/20* (2013.01); *F01N 2450/24* (2013.01); *F16L 21/065* (2013.01); *F16L 23/04* (2013.01)

(56) References Cited

U.S. PATENT DOCUMENTS

| | | |
|---|---|---|
| 2005/0099001 A1 | 5/2005 | Cassel et al. |
| 2007/0176425 A1 | 8/2007 | Ma et al. |
| 2011/0005040 A1 | 1/2011 | Col |
| 2013/0207389 A1 | 8/2013 | Rigollet |
| 2014/0217728 A1* | 8/2014 | Ghirardi ................. F16L 23/08 |
| | | 285/410 |
| 2016/0053783 A1 | 2/2016 | Koehler et al. |
| 2017/0284578 A1 | 10/2017 | Prevot et al. |
| 2017/0292643 A1* | 10/2017 | Prevot ................... F16L 59/184 |

FOREIGN PATENT DOCUMENTS

| | | |
|---|---|---|
| CN | 203823287 U | 9/2014 |
| GB | 2446813 A | 8/2008 |
| WO | 2012013891 A1 | 2/2012 |
| WO | 2012/172163 A1 | 12/2012 |
| WO | 2016034820 A1 | 3/2016 |

OTHER PUBLICATIONS

PCT International Search Report & Written Opinion for PCT/US2018/015855 dated Apr. 9, 2018, 7 pages.
China National Intellectual Property Administration, First Office Action for related CN Application No. 201880016287.3, dated Nov. 23, 2020, 14 pages (with appended English translation).

* cited by examiner

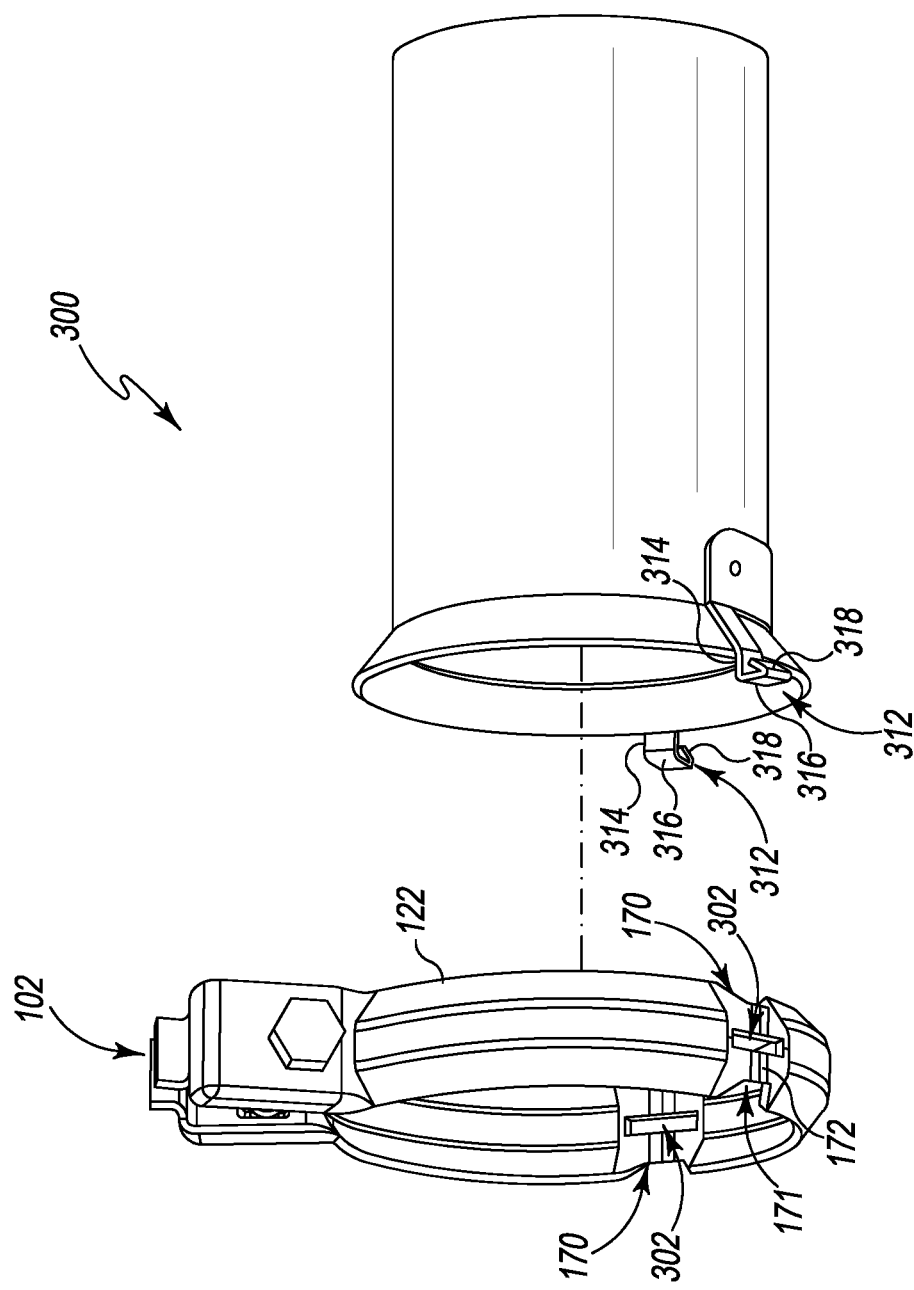

EXHAUST CLAMP AND METHOD

This application claims priority to U.S. Provisional Application No. 62/451,886, which was filed on Jan. 30, 2017 and is expressly incorporated herein by reference.

BACKGROUND

The present disclosure relates to clamp designs and, more specifically, to a design for an exhaust clamp.

TECHNICAL FIELD

Clamps are commonly utilized to join together exhaust hoses and fittings or connectors, for example, within the automotive industry. Hose clamps may include a liner that may be spot welded, riveted, or otherwise fastened to a circular outer band and a locking mechanism to couple the ends of the outer band together and apply tension to the clamp. One type of exhaust clamp is a band clamp, which typically includes at least one inner segment contained by a circular outer band. The outer band includes a tensioning mechanism to apply tension to the band when tightened that in turn applies a radial pressure to the inner segment. The inner segment converts most of the radial pressure in the joint formed between a pair of conduits to axial pressure on the joint, while still maintaining a smaller radial pressure on the joint. Additionally, some variants of band clamps are designed to allow for a small axial misalignment between the conduits forming the joint, for example, when the joint includes a full marmon on one conduit and a flared end on the other conduit.

Band clamps are generally designed to accommodate for either axial misalignment or near equal distribution of radial versus axial pressure on the joint. When accommodating for axial misalignment, many of these band clamps rely on radial pressure to prevent the joint from pulling apart, i.e. the clamp does not provide for both radial and axial sealing pressure. Radial pressure is achieved by providing slots in the outer conduit that enable the outer conduit to deform and crush on the inner conduit. Such slots frequently enable potential leaks in the joint. Other known clamps require spot welding to seal the joint. The required spot welding nullifies a large majority of the axial pressure generated on the joint, thereby preventing the conduits from axially pulling apart. However, a clamp utilizing required spot welding generally does not provide for axial misalignment in the joint.

SUMMARY

According to one aspect of the disclosure, an assembly having a band clamp positioned on a female conduit is disclosed. The band clamp is secured to the female conduit such that the band clamp has limited axial rotation about the female conduit. More particularly, the band clamp includes one or more attachment flanges that are secured to corresponding retaining clip(s) of the female conduit. In some embodiments, the retaining clip(s) may include an opening or cavity to receive a portion of the attachment flange. Additionally, in some embodiments, the retaining clip(s) may include a tab that is inserted into a corresponding slot of the attachment flange(s). In some embodiments, the male conduit may include a retaining bracket or retaining clip that is inserted into another corresponding slot of another attachment flange.

The band clamp may be secured to the female conduit such that a clearance is maintained between the band clamp and the female conduit. The clearance enables a male conduit to be inserted into the female conduit. After the male conduit is positioned within the female conduit, the band clamp is tightened to secure the male conduit to the female conduit. The male conduit may be secured to the female conduit such that limited axial misalignment between the male conduit and the female conduit is permitted.

According to another aspect, an assembly is provided. The assembly includes a band clamp having a band including an inner surface facing toward a central axis. The inner surface includes a pair of curved surface sections joined to a substantially flat surface section when viewed in cross-section. The band also includes an attachment flange. The assembly includes a conduit having a substantially cylindrical body having an axis. A flared flange extends radially outwardly from the cylindrical body. The conduit includes a retaining clip extending from the flared flange. The band clamp is secured to the conduit such that the flared flange of the conduit is positioned within the band, and the retaining clip of the conduit is secured to the attachment flange of the band.

In some embodiments, the conduit may be a first conduit. The band clamp may be retained on the flared flange while maintaining a clearance between the band and the flared flange so that a flange of a second conduit is positionable within the flared flange of the first conduit.

In some embodiments, the attachment flange may include a channel that is defined in the band and extends parallel to the central axis and an outer wall that includes a substantially flat surface positioned at a base of the channel. The band may have an annular groove that is defined between a pair of side walls, and each side wall may include one of the curved surface sections when viewed in cross-section. The channel of the attachment flange may extend through the side walls to open into the annular groove. The substantially flat surface of the attachment flange may extend from an opening defined in a first side wall of the pair of side walls and another opening defined in a second side wall of the pair of side walls.

In some embodiments, the retaining clip may define an opening, and the outer wall of the attachment flange may be positioned within the opening. In some embodiments, a slot may be formed in the attachment flange. The retaining clip may be secured within the slot when the retaining clip is secured to the at least one attachment flange. Additionally, in some embodiments, the conduit may be a first conduit, and the band may include a second attachment flange and a second slot formed in the attachment flange. The second slot may be sized to receive a retaining bracket extending from a second conduit configured to be coupled to the first conduit.

In some embodiments, the band may include two attachment flanges, and the conduit includes two retaining clips. A first of the two retaining clips may be secured to a first of the two attachment flanges. A second of the two retaining clips may be secured to a second of the two attachment flanges.

In some embodiments, the band clamp may include a tensioning mechanism joining a first end and a second end of the band. The attachment flange may be positioned greater than 90° from the tensioning mechanism around a circumference of the band.

In some embodiments, the flange of the second conduit may include an alignment indent. The retaining clip may be positioned in the alignment indent when the flange of the second conduit is positioned within the flared flange of the first conduit. In some embodiments, the second conduit may include a bracket positioned partially around the flange of the second conduit. The retaining clip may abut an end of the bracket when the flange of the second conduit is positioned within the flared flange of the first conduit. In some embodiments, the flange of the second conduit may include a catch. The catch may be configured to be positioned within the attachment flange when the flange of the second conduit is positioned within the flared flange of the first conduit.

According to another aspect, an assembly comprises a clamp including a band having an annular groove defined therein. The annular groove is defined between a pair of curved band surface sections joined to a substantially flat band surface section when the clamp is viewed in cross-section. The assembly also includes a conduit having a substantially cylindrical body having an axis. A flared flange extends radially outwardly from the cylindrical body, and a retaining clip extends from the flared flange. The band clamp is secured to the conduit such that the flared flange of the conduit is positioned within the band, and the retaining clip of the conduit is secured to the band.

In some embodiments, the conduit may be a first conduit, and the clamp may be configured to be retained on the flared flange so that a flange of a second conduit is positionable within the flared flange of the first conduit.

In some embodiments, the second conduit may include a bracket positioned partially around the flange of the second conduit, and the retaining clip may be configured to abut an end of the bracket when the flange of the second conduit is positioned within the flared flange of the first conduit.

In some embodiments, the flange of the second conduit includes a catch and the band of the clamp includes an attachment flange, the catch being configured to be positioned within the attachment flange when the flange of the second conduit is positioned within the flared flange of the first conduit.

In some embodiments, the band may include slot formed in the attachment flange, and the second conduit may include a retaining bracket configured to be positioned in the slot defined in the band.

In some embodiments, the retaining clip may define an opening, a portion of the band is positioned within the opening when the retaining clip is secured to the band. Additionally, in some embodiments, a slot may be formed in the band, and the slot may be sized to receive the retaining clip, wherein the retaining clip may be configured to be secured within the slot.

In some embodiments, the band may further include an attachment flange formed thereon. The attachment flange may include a channel that is defined in the band and an outer wall that includes a substantially flat surface positioned at a base of the channel.

In some embodiments, the retaining clip may define an opening, and the outer wall of the attachment flange is positioned within the opening.

Additionally, in some embodiments, the conduit may be a first conduit, and the band may include a second attachment flange and a second slot formed in the second attachment flange. The second slot may be sized to receive a retaining bracket extending from a second conduit configured to be coupled to the first conduit.

According to another aspect, a method of securing a clamp to a conduit is disclosed. The method comprises positioning a band of the clamp over a conduit, and sliding the band onto a flared flange extending radially outwardly from a cylindrical body of the conduit to position the flared flange within the band and to secure a retaining clip of the conduit to an attachment flange of the band.

In some embodiments, the conduit is a first conduit, and the method may further comprise retaining the clamp on the flared flange while positioning a flange of a second conduit in the flared flange of the first conduit.

In some embodiments, the method may further comprise advancing the band over a retaining bracket extending from the second conduit. Additionally, in some embodiments, the method may further comprise tightening a tensioning mechanism of the clamp after the flange of the second conduit is positioned within the flared flange of the first conduit to secure the first conduit to the second conduit.

In some embodiments, method may further comprise positioning the attachment flange within an opening defined by the at least one retaining clip. In some embodiments, method may further comprise securing the retaining clip within a slot formed in the attachment flange.

BRIEF DESCRIPTION OF THE DRAWINGS

The foregoing and other features of the various embodiments of the methods and apparatuses described herein will become more apparent from the following detailed description and the accompanying drawings in which:

FIG. 7 is an exploded perspective view of another embodiment of an assembly having a band clamp and a female conduit;

DETAILED DESCRIPTION OF THE DRAWINGS

Figure 1:
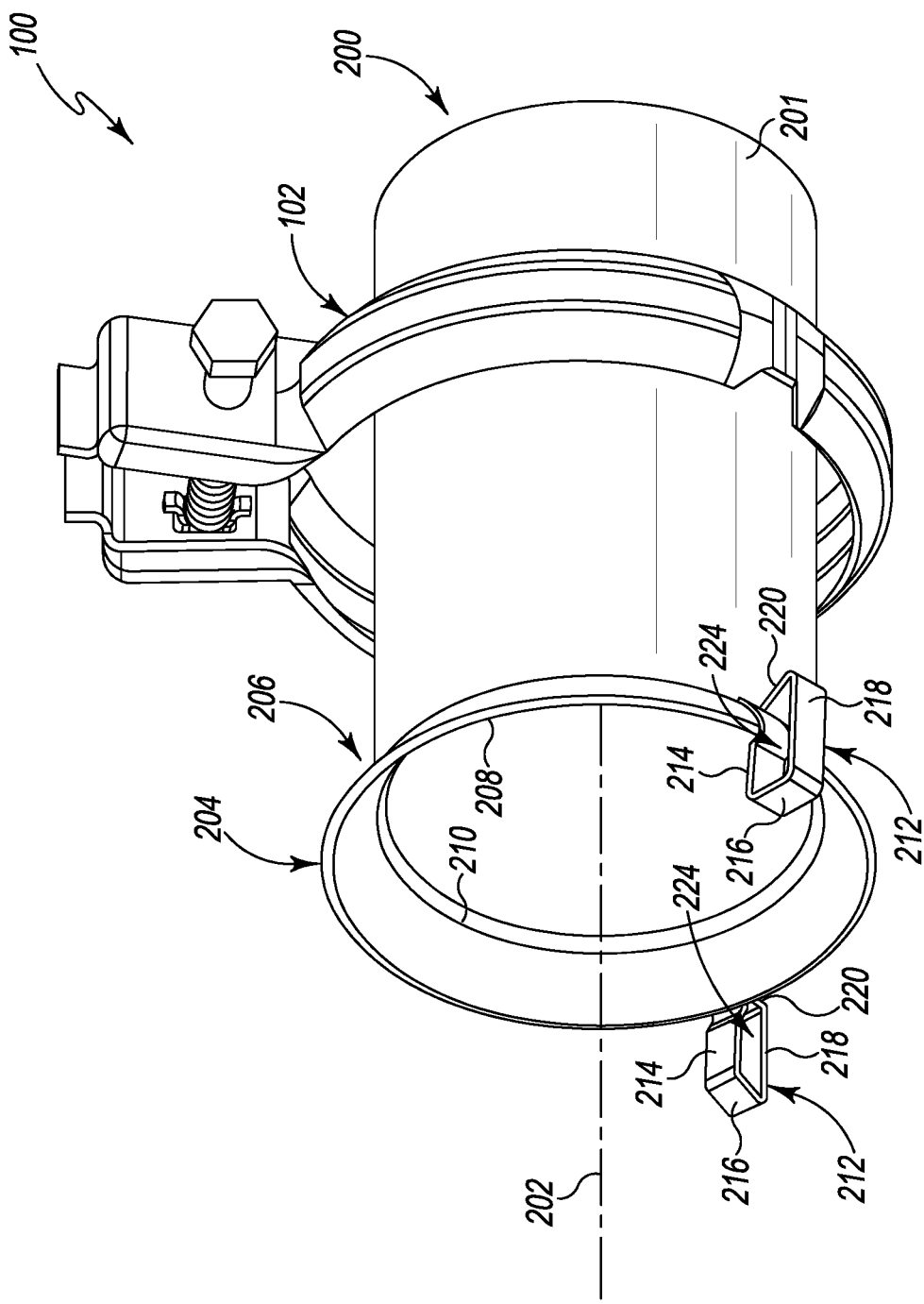
FIG. 1 is a perspective view of one embodiment of an assembly having a band clamp and a conduit.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, an assembly 100 including a band clamp 102 positioned on a female exhaust conduit 200 is shown. In the illustrative embodiment, the assembly 100 is configured for use in a joint of an automotive exhaust system. It should be appreciated that in other embodiments the assembly 100 may be configured for use in other joints in other automotive or commercial applications. The female exhaust conduit 200 has a cylindrical body 201 that may be coupled to another component of the exhaust system, such as, for example a male conduit 250 (see FIG. 4). As described in greater detail below, the band clamp 102 is secured to the female conduit 200 such that the band clamp 102 has limited axial rotation about the female conduit 200 and is thereby maintained in position to properly secure the conduits 200, 250 together.

In the illustrative embodiment, the band clamp 102 is secured to the female conduit 200 such that axial rotation about an axis 202 of the cylindrical body 201 is limited. The band clamp 102 is also secured to the female conduit 200 such that a clearance is maintained between the band clamp 102 and the female conduit 200. The clearance enables the male conduit 250 to be inserted into the female conduit 200. After the male conduit 250 is positioned within the female conduit 200, the band clamp 102 is tightened to secure the male conduit 250 to the female conduit 200. The male conduit 250 may be secured to the female conduit 200 such that limited axial misalignment between the male conduit 250 and the female conduit 200 is permitted.

As shown in FIG. 1, the female conduit 200 includes a flared flange 204 that extends radially outwardly with respect to the axis 202 of the cylindrical body 201. The flared flange 204 is positioned at a forward end 206 of the female conduit 200. The flared flange 204 includes a radially outward end 208 and a radially inward end 210. The flared flange 204 has a substantially curved profile from the radially inward end 210 to the radially outward end 208.

In the illustrative embodiment, a pair of retaining clips 212 are coupled to the flared flange 204. In particular, the retaining clips 212 are coupled to the radially outward end 208 of the flared flange 204. It will be appreciated that any number of retaining clips 212 may be coupled to the flared flange 204, including one or more than two. The retaining clips 212 may be positioned at any location around a circumference of the flared flange 204. It should also be appreciated that in other embodiments one or more of the retaining clips may be replaced with a retaining bracket similar to that described below in regard to FIGS. 13-16.

Each retaining clip 212 includes an inner arm 214 extending from the flared flange 204. The inner arm 214 extends forward from the flared flange 204. A nose 216 is coupled to the inner arm 214 and extends radially outwardly from the inner arm 214. An outer arm 218 is coupled to the nose 216 and extends back from the nose 216 in the direction of the flared flange 204. The retaining clip 212 also includes a cantilevered end 220 extends radially inwardly at an angle from the outer arm 218. A space is provided between the end 220 and the flared flange 204 to receive a portion of the clamp 102.

The retaining clip 212 is elastic such that the end 220 may be moved from a first position adjacent the flared flange 204 to a second position spaced apart from the flared flange when subjected to force. The end 220 then returns to the first position when the force is removed. For example, the end 220 of the retaining clip 212 may be elastically moved from the flared flange 204 to increase the space between the flared flange 204 and the end 220 of the retaining clip 212. The elasticity of the retaining clip 212 enables the band clamp 102 to be inserted through the space between end 220 and the flared flange 204 and retained within a cavity or opening 224 defined by the retaining clip 212. As shown in FIG. 1, the opening 224 is defined between the inner arm 214, the nose 216, the outer arm 218, and the end 220. When a force is not being applied to the end 220, the retaining clip 212 retains its position around the band clamp 102 to secure the band clamp 102 to the conduit 200.

Figure 2:
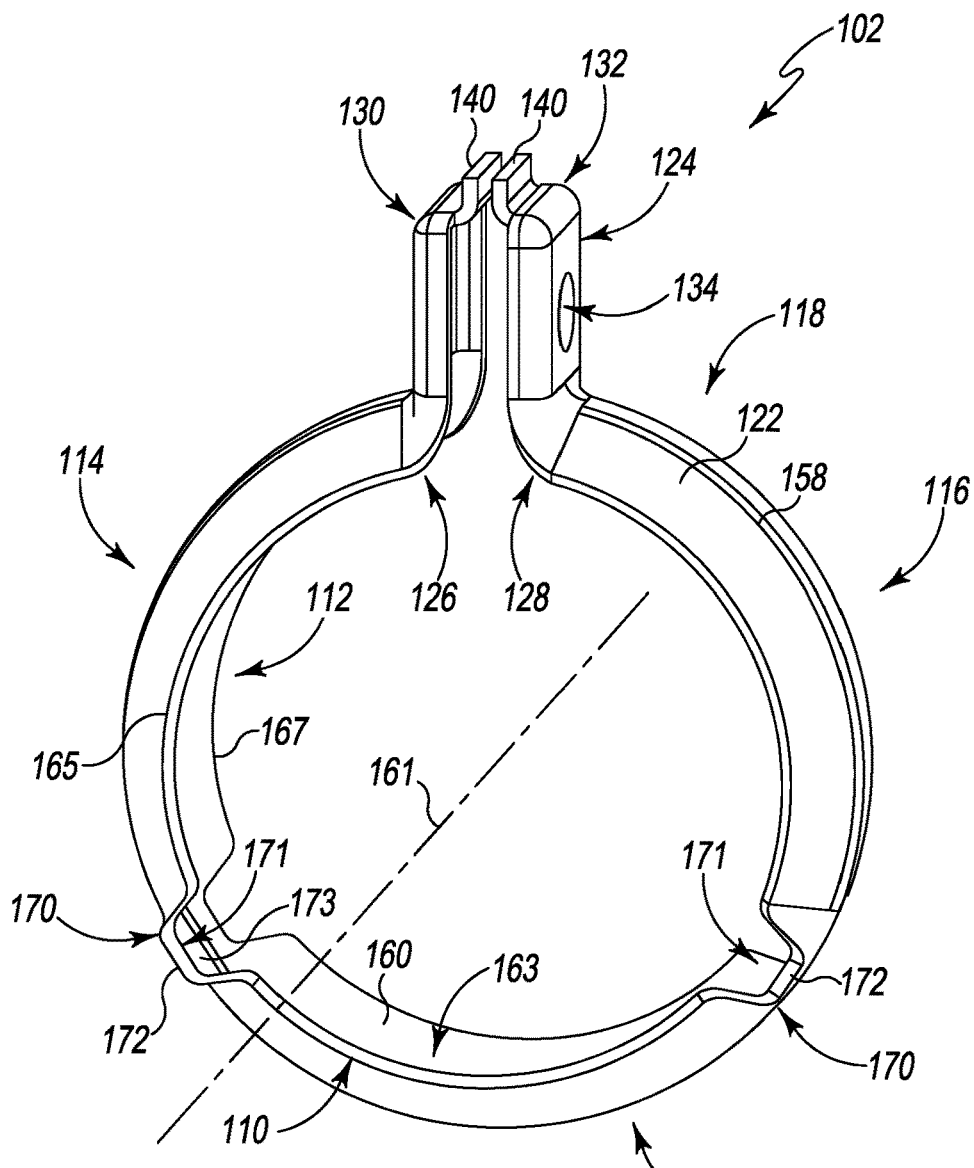
FIG. 2 is a perspective view of the band clamp of FIG. 1.

Referring to FIG. 2, the band clamp 102 includes a central axis 161 that is substantially co-linear with the axis 202 of the conduit 200 when the band clamp 102 is positioned on the conduit 200. The band clamp 102 includes a front 110 corresponding to the forward end of the conduit 200 and an opposite back 112. The band clamp 102 also includes a first side 114 and a second side 116. In the illustrative embodiment, the first side 114 and the second side 116 are substantially symmetrical about a median plane extending from the central axis 161. The band clamp 102 also includes a first half 118 and a second half 120 divided about a traverse plane extending from the central axis 161.

The band clamp 102 includes a band 122 having a tensioning mechanism 124 coupled thereto. The band 122 has a first end 126 and a second end 128 that are configured to be joined by the tensioning mechanism 124. The tensioning mechanism 124 is shown in FIG. 2 as being positioned in the first half 118 of the band clamp 102.

Figure 4:
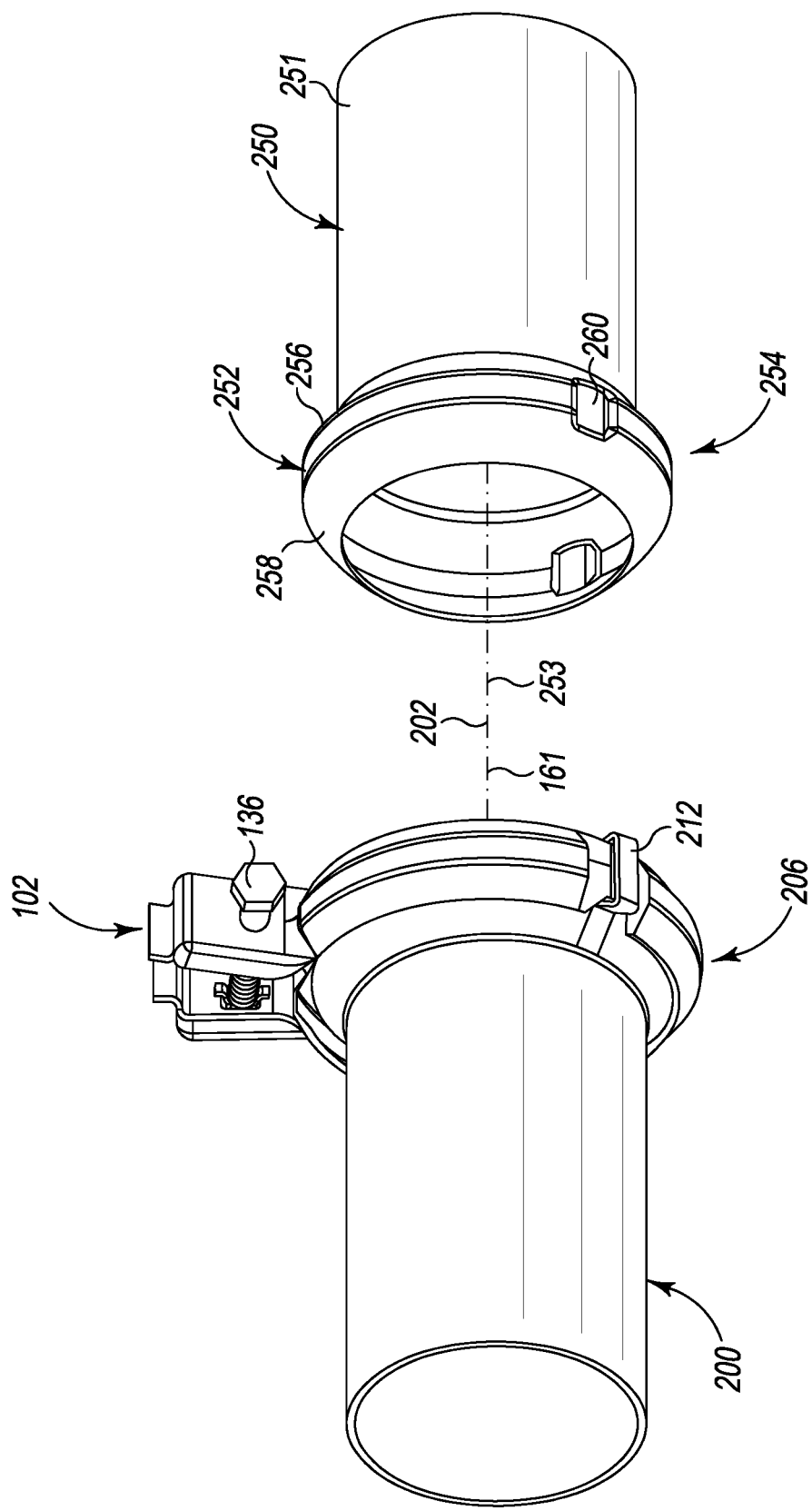
FIG. 4 is a perspective view of a male conduit of FIG. 1 aligned with the assembly of FIG. 1.
Figure 6:
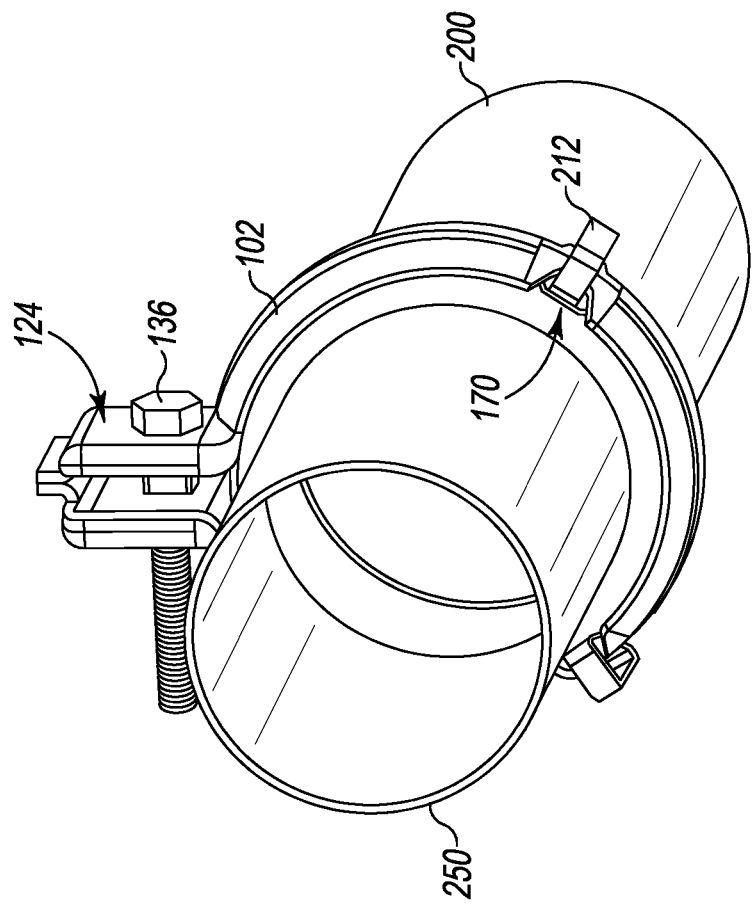
FIG. 6 is a perspective view of the male conduit and assembly of FIG. 4 coupled together.
Figure 5:
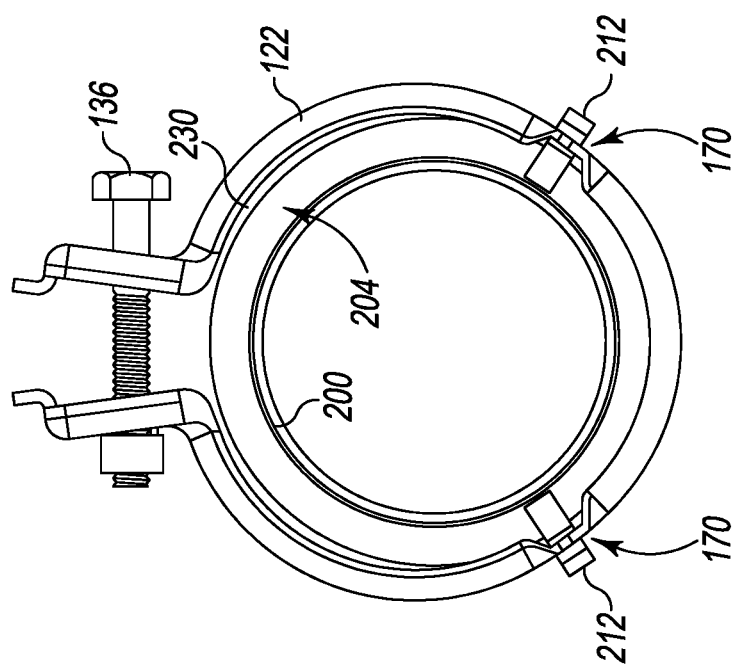
FIG. 5 is an elevation view of the male conduit and assembly of FIG. 4.

The tensioning mechanism 124 is defined by a first flange 130 and a second flange 132. The first flange 130 extends radially outward from the first end 126 of the band 122, and the second flange 132 extends radially outward from the second end 128 of the band 122. The first flange 130 and the second flange 132 are substantially parallel in the illustrative embodiment. An aperture 134 extends through each of the first flange 130 and the second flange 132, and each aperture 134 is configured to receive a fastener. For example, FIGS. 4-6 illustrate a bolt 136 extending through the apertures 134. It will be appreciated by one of skill in the art that the apertures 134 may receive any fastener, for example, a screw. The fastener (i.e., bolt 136) is configured to be tightened to draw the first flange 130 and the second flange 132 together, thereby drawing the first end 126 and the second end 128 of the band 122 together to tighten the band 122 about the female conduit 200.

As shown in FIG. 2, a tab 140 extends from each of the first flange 130 and the second flange 132. The tabs 140 prevent overtightening of the band clamp 102, i.e., the first flange 130 and the second flange 132 of the tensioning mechanism are prohibited from abutting each other. A length of the tabs 140 may be predetermined to provide a predetermined degree of tightening within the tensioning mechanism 124. Although the tensioning mechanism 124 is shown in FIG. 2 as having a pair of flanges 130, 132 including apertures 134 that receive a fastener, it will be appreciated that any suitable tensioning mechanism may be utilized with the band clamp 102.

Figure 3:
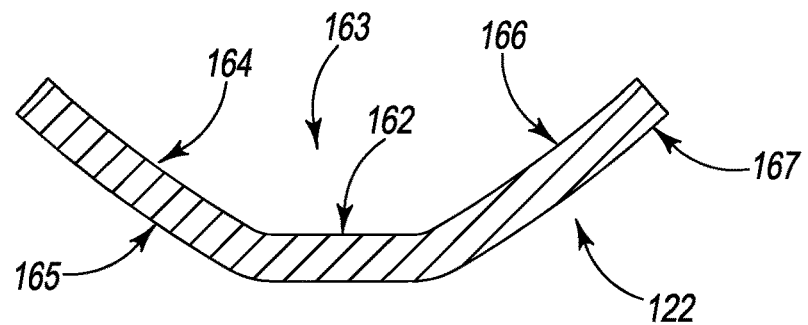
FIG. 3 is a cross-sectional view of a band of the band clamp of FIG. 2 taken along the line 3-3 of FIG. 2.

The band 122 includes an outer surface 158 and an inner surface 160 that extend around the central axis 161. In the illustrative embodiment, the band 122 has an annular groove 163 that is defined in the inner surface 160 by a pair of side walls 165, 167. As shown in FIG. 3, the groove 163 has a cross-sectional profile that is V-shaped, or alternatively C-shaped. The band 122 includes an annular band surface section 162, which is substantially flat when viewed in cross-section, as shown in FIG. 3. It should be understood that the term "substantially" refers to a range within typical manufacturing tolerances.

The surface section 162 extends circumferentially about the band 122 from the first end 126 to the second end 128 of the band 122. A pair of curved band surface sections 164, 166 of the side walls 165, 167, respectively, extend from the surface section 162 to define the groove 163 in the cross-section. The curved band surface sections 164, 166 extend from opposite sides of the surface section 162.

In the illustrative embodiment, the curved band surface sections 164, 166 are substantially symmetrical about the surface section 162. As shown in FIG. 3, each of the curved band surface sections 164, 166 has a radius of curvature when viewed in cross section of approximately 55.5°, and the curved profile of at least one of the curved band surface sections 164, 166 substantially mirrors the curved profile of the flared flange 204 of the female conduit 200. The curved band surface sections 164, 166 flare outward from the flat band surface section 162, i.e., the curved band surface section 164 flares outward from the flat band surface section 162 toward the front 110 of the band clamp 102, and the curved band surface section 166 flares outward from the flat band surface section 162 toward the back 112 of the band clamp 102. In some embodiments, when viewed in cross section, the curved band surface section 164 and the curved band surface section 166 may extend at an angle of approximately 105° to 109° with respect to each other.

Referring back to FIG. 2, the band 122 further includes a pair of attachment flanges 170. Each attachment flange 170 includes a channel 171 that extends through the side walls 165, 167. The attachment flanges 170 are shown in FIG. 2 as being positioned in the second half 120 of the band clamp 102, and the tensioning mechanism 124 is shown as being positioned in the first half 118 of the band clamp 102. In one embodiment, the attachment flanges 170 are positioned greater than 90° from the tensioning mechanism 124 about the central axis 161. It will be appreciated that the band clamp 102 may include any number of attachment flanges 170, including one or more than two. Additionally, it will be appreciated that the attachment flanges 170 may be positioned at any location of the band clamp 102, including the first half 118 of the band clamp 102. As described in greater detail below, the band clamp 102 includes the same number of attachment flanges 170 as the number of retaining clips or brackets on the female (and, in some cases, male) conduits, and the attachments flanges 170 are positioned on the band 122 so that the attachment flanges 170 may be aligned with the retaining clips or brackets of the conduits.

As shown in FIG. 2, each attachment flange 170 includes an outer wall 172 that is positioned at the base of each channel 171. The outer wall 172 includes an inner surface 173 that is substantially planar and extends parallel to the central axis 161. In the illustrative embodiment, the inner surface 173 extends from the front 150 of the band 122 to the back 152 of the band 122.

Referring now to FIGS. 4-6, the band clamp 102 is configured to secure the female conduit 200 to a male conduit 250 having a cylindrical body 251 with an axis 253. A flared flange 252 extends radially outwardly from the cylindrical body 251 at a back end 254 of the cylindrical body 251. The back end 254 of the male conduit 250 is configured to be coupled to the forward end 206 of the female conduit 200. The flared flange 252 includes a front curved section 256 and a back curved section 258 that has a profile that substantially mirrors the profile of the flared flange 204 of the female conduit 200. The front curved section 256 and the back curved section 258 each have a profile that substantially mirrors the profile of the curved band surface sections 164 and 166 of the clamp 102.

The male conduit 250 also includes alignment indents 260 that are formed in the flared flange 252 of the male conduit 250. In the illustrative embodiment, the male conduit 250 includes the same number of alignment indents 260 as the number of retaining clips 212 on the female conduit 200. The alignment indents 260 are positioned to align with the retaining clips 212 of the female conduit 200. It should be appreciated that in other embodiments the alignment indent may be omitted.

As shown in FIG. 5, to assemble the clamp 102 to the female conduit 200, the attachment flanges 170 of the band 122 are aligned with the retaining clips 212 of the female conduit 200. The band clamp 102 is then secured to the flared flange 204 of the female conduit 200 by advancing the clamp 102 along the female conduit 200 to secure the retaining clips 212 to the band 122 to the attachment flanges 170 of the band 122. To do so, the attachment flange 170 is inserted through the space between the end 220 of the retaining clip 212 and the flared flange 204 such that at least a portion of the attachment flange 170 is positioned within the opening 224 defined by the retaining clip 212. Attaching the band 122 to the retaining clips 212 secures the band clamp 102 to the female conduit 200 while limiting axial rotation of the band clamp 102 with respect to the female conduit 200. It should be appreciated that the tensioning mechanism 124 of the band clamp 102 may remain untightened such that a clearance 230 is provided between the band 122 of the band clamp 102 and the flared flange 204 of the female conduit 200.

As shown in FIG. 6, the male conduit 250 is coupled to the assembly 100 (i.e. female conduit 200 having band clamp 102 joined thereto). The male conduit 250 is coupled to the female conduit 200 so that the flared flange 252 of the male conduit 250 is received within the flared flange 204 of the female conduit 200. The flared flange 252 is inserted into the clearance 230 provided between the band 122 and the flared flange 204 of the female conduit 200. The inner arm 214 of each retaining clip 212 is aligned with and abuts the alignment indents 260 of the male conduit 250 to limit axial rotation of the male conduit 250 with respect to the female conduit 200. The band 122 of the band clamp 102 is positioned around the flared flange 252 such that the band 122 is positioned around both the flared flange 252 of the male conduit 250 and the flared flange 204 of the female conduit 200.

By tightening the tensioning mechanism 124, the band clamp 102, i.e., the band 122, is secured to the flared flange 252 of the male conduit 250 and the flared flange 204 of the female conduit 200 to secure the male conduit 250 to the female conduit 200, as shown in FIG. 6. The band clamp 102 secures the male conduit 250 to the female conduit 200 such that limited axial misalignment is enabled between the male conduit 250 and the female conduit 200. The band clamp 102 also secures the male conduit 250 and the female conduit 200 while limiting axial rotation of the male conduit 250 with respect to the female conduit 200.

Referring now to FIG. 7, another assembly 300 has an alternative embodiment of the band clamp 102. The band clamp 102 includes a slot 302 extending through the band 122, which is sized to receive a retaining clip or bracket of the conduits. In the illustrative embodiment, the band clamp 102 includes a slot 302 that is defined each attachment flange 170. Each slot 302 extends through the outer wall 172 positioned at the base of the channel 171 defined by the attachment flange 170.

The assembly 300 also includes an alternative embodiment of the female conduit 200. In the illustrative embodiment, the retaining clip 212 is replaced by a retaining clip 312. The retaining clip 312 includes an arm 314 that extends from the flared flange 204. A nose 316 extends radially outwardly from the arm 314. A tab 318 extends at an angle back from the nose 316 toward the flared flange 204 and radially inwardly toward the flared flange 204. The retaining clip 212 is elastic such that the tab 318 may bend toward the nose 316 to enable the tab 318 and the nose 316 to be inserted into the slot 302.

Figure 8:
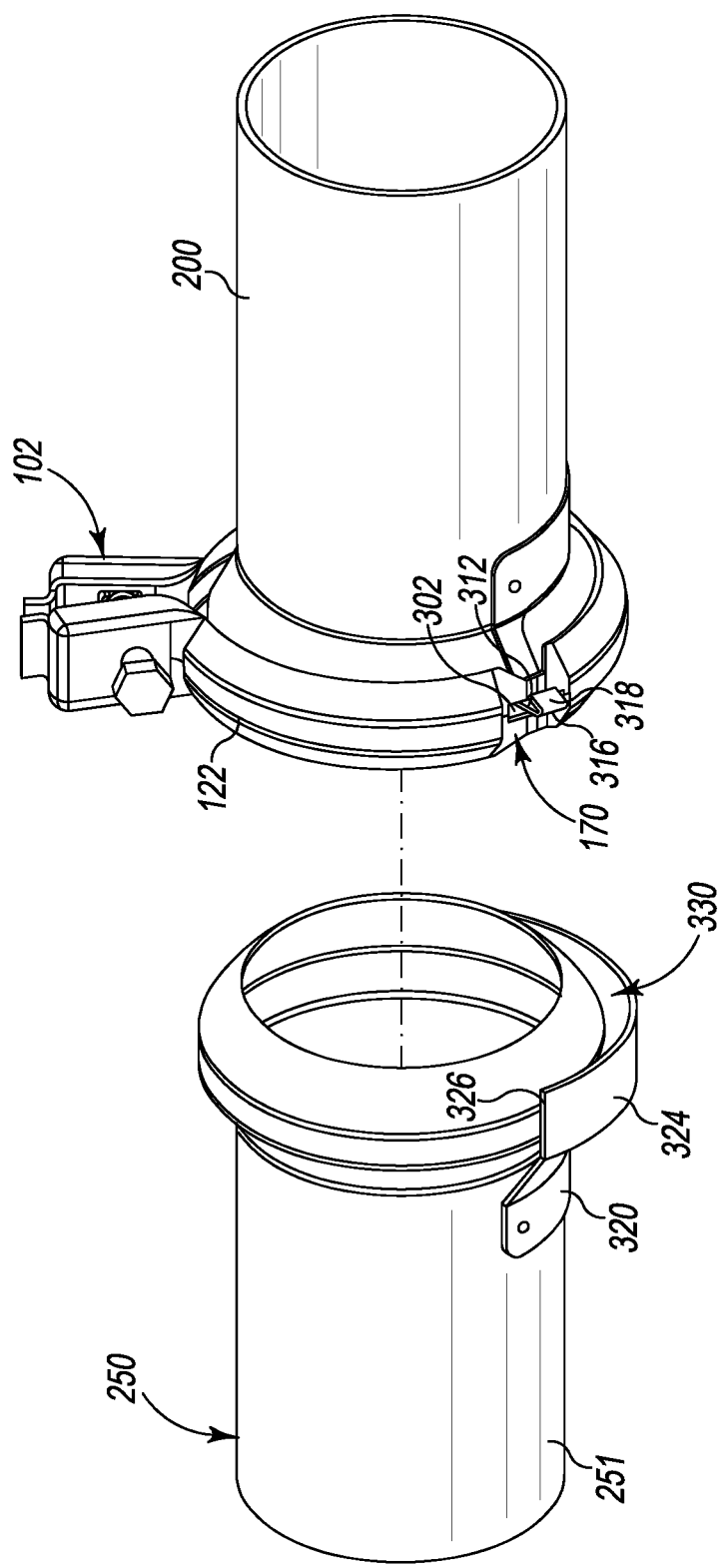
FIG. 8 is a perspective view of the assembly of FIG. 7 aligned with a male conduit.

Referring now to FIG. 8, the band clamp 102 is secured to the female conduit 200. The attachment flanges 170 of the band 122 are aligned with the retaining clips 312 of the female conduit 200. The band clamp 102 is then secured to the flared flange 204 of the female conduit 200 by securing the retaining clips 312 to the band 122. Specifically, the retaining clips 312 are secured to the attachment flanges 170 of the band 122. The tab 318 and nose 316 of the retaining clips 312 are inserted into the slots 302 of the attachment flanges 170. The tab 318 is pushed toward the nose 316 by the band 122 until the tab 318 clears the slot 302.

Figure 9:
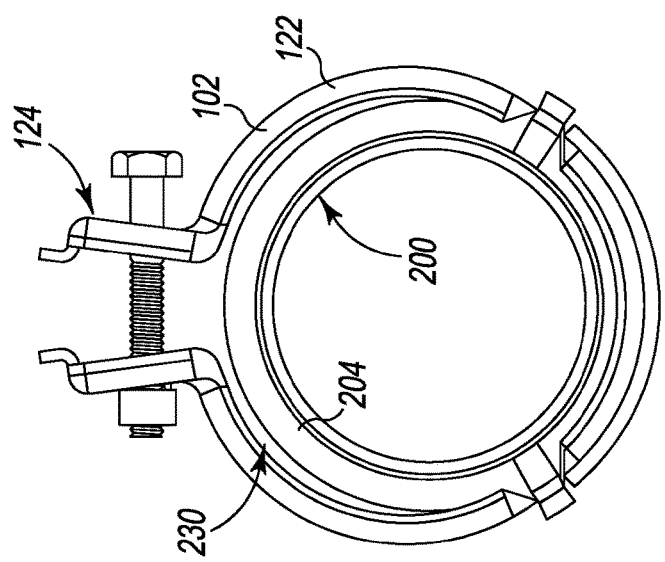
FIG. 9 is an elevation view of the male conduit and assembly of FIG. 8.

After clearing the slot 302, the tab 318 returns to its original position such that the tab 318 is secured against the outer surface 158 of the band 122. The tab 318 and at least a part of the nose 316 extend radially outwardly from the band 122. Attaching the retaining clips 312 to the band 122 secures the band clamp 102 to the female conduit 200 while limiting axial rotation of the band clamp 102 with respect to the female conduit 200. As shown in FIG. 9, the tensioning mechanism 124 of the band clamp 102 may remain untightened such that a clearance 230 is provided between the band 122 of the band clamp 102 and the flared flange 204 of the female conduit 200.

Referring again to FIG. 8, the assembly 300 is aligned with an alternative embodiment of the male conduit 250. The male conduit 250 includes a bracket 320 that is secured to the cylindrical body 251 of the male conduit 250. The bracket 320 includes a partially cylindrical flange 324 extending partially around the flared flange 252 between a pair of ends 326. The ends 326 are positioned to align with the retaining clips 312 of the female conduit 200. The flange 324 is spaced from the flared flange 252 to provide a clearance 330 between the flared flange 252 and the flange 324.

Figure 10:
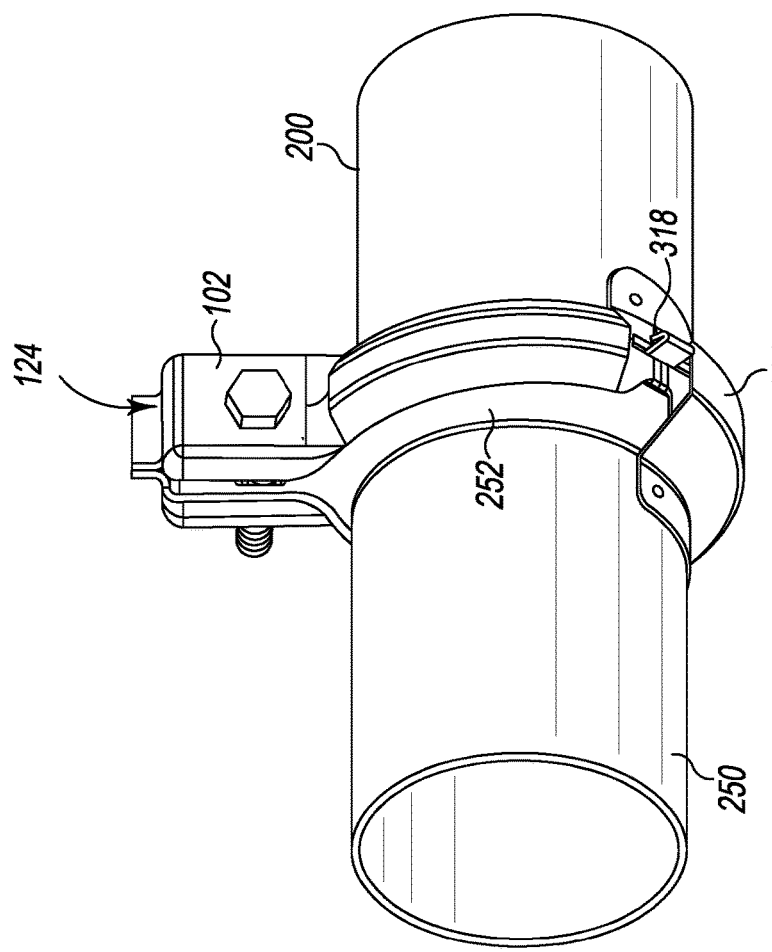
FIG. 10 is a perspective view the male conduit and assembly of FIG. 8 coupled together.

As shown in FIG. 10, the male conduit 250 is coupled to the assembly 300 (i.e. alternative female conduit 200 having alternative band clamp 102 joined thereto). The male conduit 250 is coupled to the female conduit 200 so that the flared flange 252 of the male conduit 250 is received within the flared flange 204 of the female conduit 200. The flared flange 252 is inserted into the clearance 230 provided between the band 122 and the flared flange 204 of the female conduit 200. A portion of the band clamp 102 is positioned within the clearance 330 provided between the flared flange 252 and the flange 324 of the male conduit 250. The tab 318 and the part of the nose 316 of the retaining clip 312 that extends radially outwardly from the band 122 are positioned against an end of the flange 324 of the male conduit 250. Particularly, each retaining clip 312 abuts and end 326 of the flange 324 to limit axial rotation of the female conduit 200 with respect to the male conduit 250. The band 122 of the band clamp 102 is positioned around the flared flange 252 such that the band 122 is positioned around both the flared flange 252 of the male conduit 250 and the flared flange 204 of the female conduit 200.

By tightening the tensioning mechanism 124, the band clamp 102, i.e. the band 122, is secured to the flared flange 252 of the male conduit 250 and the flared flange 204 of the female conduit 200 to secure the male conduit 250 to the female conduit 200, as shown in FIG. 10. The band clamp 102 secures the male conduit 250 to the female conduit 200 such that limited axial misalignment is enabled between the male conduit 250 and the female conduit 200. The band clamp 102 also secures the male conduit 250 and the female conduit 200 while limiting axial rotation of the male conduit 250 with respect to the female conduit 200.

Figure 11:
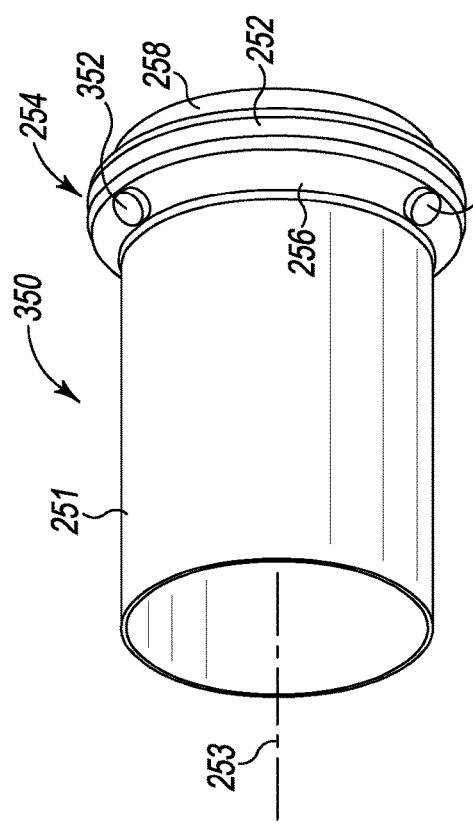
FIG. 11 is a perspective view of another embodiment of a male conduit that may be coupled to the assembly of FIG. 7.

Referring now to FIG. 11, a male conduit 350 includes several of the same components as the male conduit 250, which are referenced herein using the same reference numbers. The male conduit 350 has a cylindrical body 251 with an axis 253. A flared flange 252 extends radially outwardly from the cylindrical body 251 at a back end 254 of the cylindrical body 251. The back end 254 of the cylindrical body 251 couples to the forward end 206 of the female conduit 200. The flared flange 252 includes a front curved section 256 and a back curved section 258. The back curved section 258 has a profile that substantially mirrors the profile of the flared flange 204 of the female conduit 200. The front curved section 256 and the back curved section 258 each have a profile that substantially mirrors the profile of the curved band surface sections 164 and 166.

The male conduit 350 includes catches 352 that are positioned on the front curved section 256 of the flared flange 252. The catches 352 are positioned on the flared flange 252 of the male conduit 350 to align with the attachment flanges 170 of the band clamp 102 when the band clamp 102 is secured to the female conduit 200.

Figure 12:
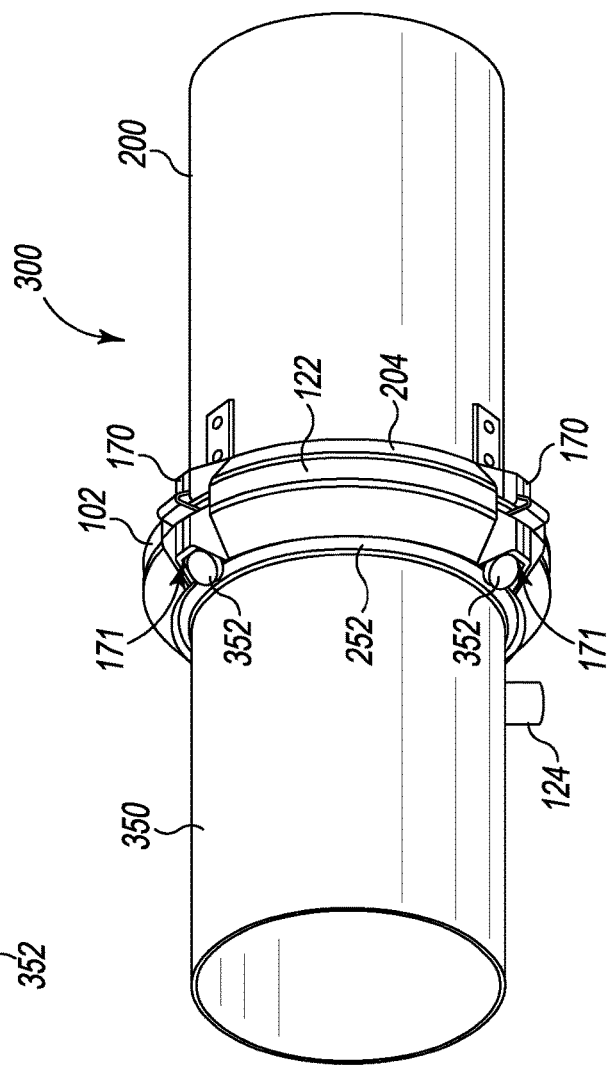
FIG. 12 is a perspective view of the male conduit of FIG. 11 coupled to the assembly of FIG. 7.

FIG. 12 shows the assembly 300 aligned with the male conduit 350 and coupled thereto. The male conduit 350 is coupled to the female conduit 200 so that the catches 352 of the male conduit 350 are received within the attachment flanges 170 of the band clamp 102. The catches 352 position within the channels 171 of the attachment flanges 170 to secure the male conduit 350 to the band clamp 102. In one embodiment, the catches 352 align the male conduit 350 with respect to the band clamp 102 and the female conduit 200.

By tightening the tensioning mechanism 124, the band clamp 102 is secured to the flared flange 252 of the male conduit 350 and the flared flange 204 of the female conduit 200 to secure the male conduit 350 to the female conduit 200. In one embodiment, the band clamp 102 secures the male conduit 350 to the female conduit 200 such that limited axial misalignment is enabled between the male conduit 350 and the female conduit 200. The band clamp 102 also secures the male conduit 350 and the female conduit 200 while limiting axial rotation of the male conduit 350 with respect to the female conduit 200.

Figure 13:
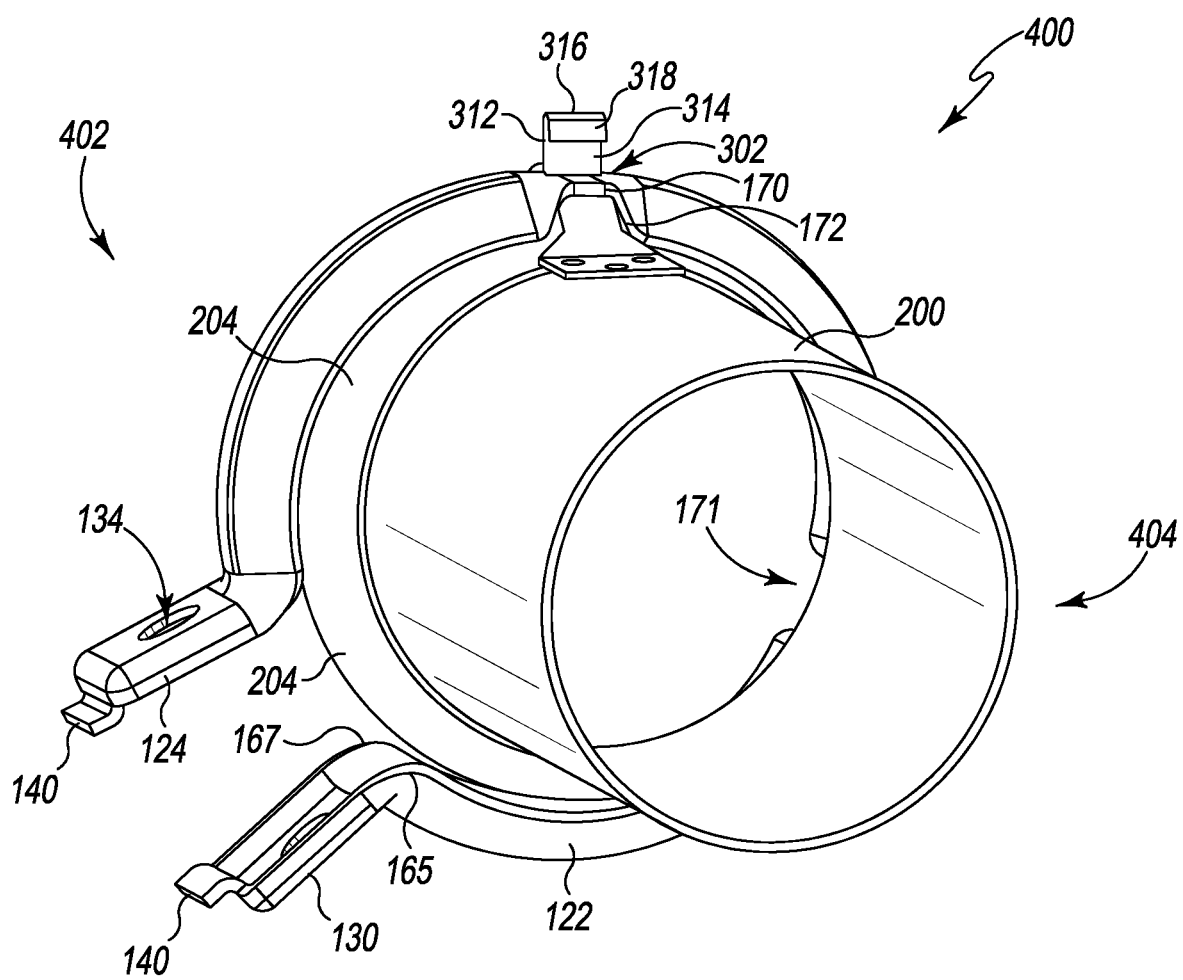
FIG. 13 is a perspective view of another embodiment of an assembly having a band clamp and a female conduit.
Figure 14:
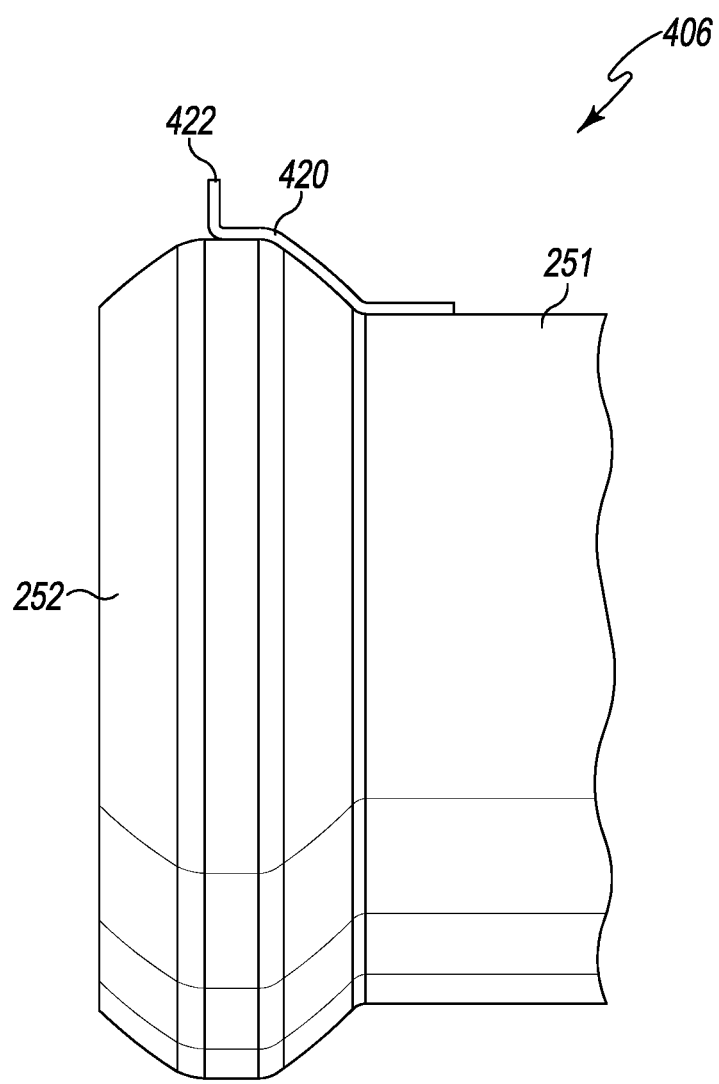
FIG. 14 is an elevation view of a male conduit configured to be coupled to the assembly of FIG. 13.
Figure 15:
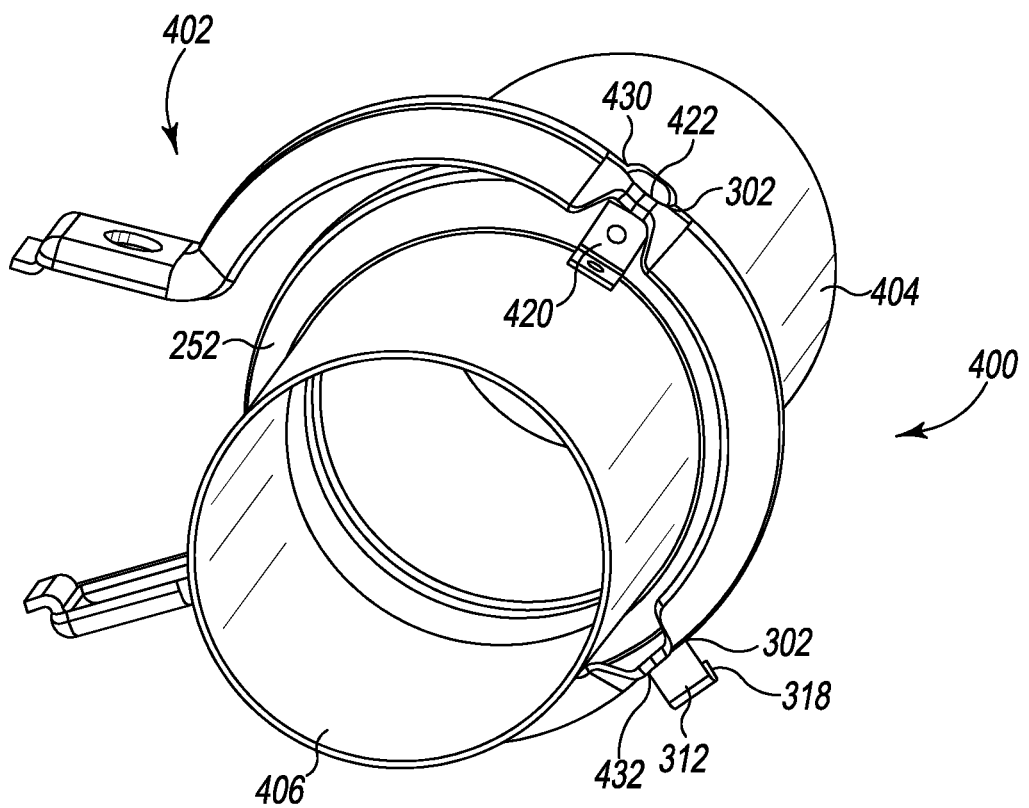
FIGS. 15-16 are perspective views of the assembly of FIG. 13 and the male conduit of FIG. 14 during assembly.
Figure 16:
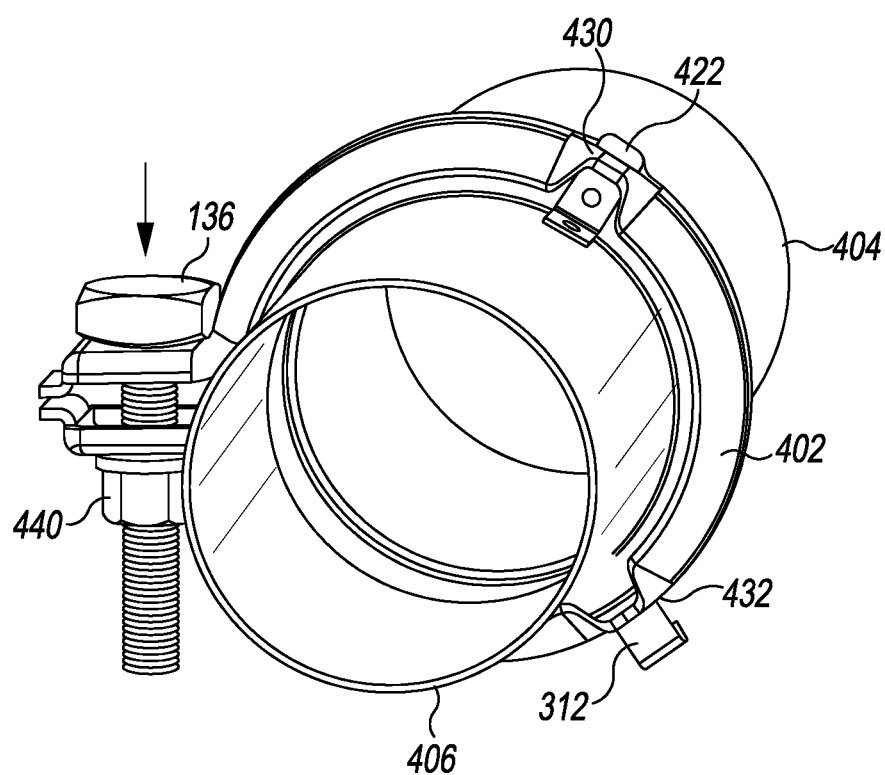

Referring now to FIGS. 13-16, another embodiment of an assembly 400 including a clamp 402 and a female conduit 404 is shown. The assembly 400 is configured to be coupled to a male conduit 406, which is shown in FIGS. 14-16. Many of the features of the assembly 400 and the male conduit 406 are the same or similar to the features described above in regard to FIGS. 1-12. The same reference numbers will be used in FIGS. 13-16 to identify the same features. Referring now to FIG. 13, the band clamp 402 includes a slot 302, which is sized to receive a retaining clip or bracket of each conduit. In the illustrative embodiment, the band clamp 402 includes a slot 302 that is defined in each attachment flange 170. Each slot 302 extends through the outer wall 172 positioned at the base of the channel 171 defined by the attachment flange 170.

The female conduit 404 includes only a single retaining clip 312, which includes an arm 314 that extends from the flared flange 204. A nose 316 extends radially outwardly from the arm 314. A tab 318 extends at an angle back from the nose 316 toward the flared flange 204 and radially inwardly toward the flared flange 204. The retaining clip 312 is elastic such that the tab 318 may bend toward the nose 316 to enable the tab 318 and the nose 316 to be inserted into the slot 302 of the clamp 402 such the clamp 402 and the conduit 404 may be assembled in a manner similar to that described above in regard to FIGS. 7-10. As shown in FIG. 13, the clamp 402 hugs the flared flange 204 to assist in retaining the clamp 402 on the conduit 404.

As shown in FIG. 14, the male conduit 406 includes a bracket 420 that is secured to the cylindrical body 251 of the male conduit 250. The bracket 420 includes a tip 422 that extends outwardly from the flared flange 252 of the body 251. In the illustrative embodiment, the tip 422 is sized to be received in one of the slots 302 defined in the clamp 402, as shown in FIG. 15.

To couple the male conduit 406 with the female conduit 404, the flared flange 252 of the male conduit 406 is advanced into the flange 204 of the female conduit 404. The clamp 402 may be bent as shown in FIG. 15 to move one of the attachment flanges (identified as flange 430) away from the tip 422 of the bracket 420 of the male conduit 406. When the flared flange 252 is seated in the flange 204 of the female conduit 404, the attachment flange 430 may be advanced over the tip 422 to position the tip 422 in the slot 302 defined in the flange 430. In that way, the retaining clip 312 of the female conduit 404 is positioned in the slot 302 of one attachment flange (identified as flange 432 in FIG. 15), while the bracket 420 of the male conduit 406 is positioned in the other slot 302 of the attachment flange 430. As shown in FIG. 16, the bolt 136 may then be tightened in the nut 440 to secure the conduits 404, 406 together with a predetermined torque.

In the illustrative embodiment of FIGS. 13-16, the slot 302 defined in the attachment flange 430 and the tip 422 of the bracket 420 are sized to permit only minimal circumferential movement between the conduit 406 and the clamp 402. Similarly, the slot 302 defined in the attachment flange 432 and the retaining clip 312 are also sized to permit only minimal circumferential movement between the conduit 404 and the clamp 402. The slots 302, tip 422, and retaining clip 312 are sized to permit up to 3 degrees of axial misalignment. It should be appreciated that in other embodiments the position of the clip 312 and bracket 420 may be reversed (i.e., the clip may be positioned on the male conduit and the bracket positioned on the female conduit).

The embodiments described above attach a female conduit to a male conduit such that a desired radial, axial and circumferential position is maintained between the female conduit and the male conduit. The assemblies maintain and axial and radial seal between the male conduit and the female conduit and limit axial rotation of the male conduit with respect to the female conduit, while providing limited axial misalignment between the male conduit and the female conduit. It will be appreciated that the devices and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. An assembly comprising:
a band clamp comprising a band including (i) an inner surface facing toward a central axis, the inner surface including a pair of curved surface sections joined to a substantially flat surface section when viewed in cross-section, and (ii) an attachment flange with an outer wall that includes a substantially flat surface positioned at a base of a channel that is defined in the band and extends parallel to the central axis; and
a conduit comprising (i) a substantially cylindrical body having an axis, (ii) a flared flange extending radially outwardly from the cylindrical body, and (iii) a retaining clip extending from the flared flange,
wherein the band clamp is secured to the conduit such that the flared flange of the conduit is positioned within the band, and the retaining clip of the conduit is secured to the outer wall of the attachment flange.

2. The assembly of claim 1, wherein the conduit is a first conduit, and the band clamp is retained on the flared flange while maintaining a clearance between the band and the flared flange so that a flange of a second conduit is positionable within the flared flange of the first conduit.

3. The assembly of claim 1, wherein:
the band has an annular groove that is defined between a pair of side walls, each side wall including one of the curved surface sections when viewed in cross-section, and
the channel of the attachment flange extends through the side walls to open into the annular groove.

4. The assembly of claim 3, wherein the substantially flat surface of the attachment flange extends from an opening defined in a first side wall of the pair of side walls and another opening defined in a second side wall of the pair of side walls.

5. The assembly of claim 1, wherein the retaining clip defines an opening, and the outer wall of the attachment flange is positioned within the opening.

6. The assembly of claim 1, wherein the band further comprises a slot formed in the attachment flange, and the retaining clip is configured to be positioned within the slot when the retaining clip is secured to the attachment flange.

7. The assembly of claim 6, wherein the conduit is a first conduit, and the band includes a second attachment flange and a second slot formed in the attachment flange, the second slot being sized to receive a retaining bracket extending from a second conduit configured to be coupled to the first conduit.

8. The assembly of claim 1, wherein:
the band further comprises two attachment flanges; and
the conduit further comprises two retaining clips, wherein a first of the two retaining clips is secured to a first of the two attachment flanges, and a second of the two retaining clips is secured to a second of the two attachment flanges.

9. The assembly of claim 1, wherein the band clamp further comprises a tensioning mechanism joining a first end and a second end of the band, the attachment flange being positioned greater than 90° from the tensioning mechanism around a circumference of the band.

10. An assembly comprising:
a clamp comprising a band having an annular groove defined therein, the annular groove being defined between a pair of curved band surface sections joined to a substantially flat band surface section when the clamp is viewed in cross-section, wherein the band includes an attachment flange with an outer wall that includes a substantially flat surface positioned at a base of a channel defined in the band, and
a conduit comprising:
a substantially cylindrical body having an axis;
a flared flange extending radially outwardly from the cylindrical body, and
a retaining clip extending from the flared flange,
wherein the clamp is secured to the conduit such that the flared flange of the conduit is positioned within the band, and the retaining clip of the conduit is secured to the attachment flange of the band.

11. The assembly of claim 10, wherein the conduit is a first conduit, and the clamp is configured to be retained on the flared flange so that a flange of a second conduit is positionable within the flared flange of the first conduit.

12. The assembly of claim 11, wherein the flange of the second conduit includes an alignment indent, and the retaining clip is positioned in the alignment indent when the flange of the second conduit is positioned within the flared flange of the first conduit.

13. The assembly of claim 11, wherein the second conduit includes a bracket positioned partially around the flange of the second conduit, and the retaining clip is configured to abut an end of the bracket when the flange of the second conduit is positioned within the flared flange of the first conduit.

14. The assembly of claim 11, wherein the flange of the second conduit includes a catch, the catch being configured to be positioned within the attachment flange when the flange of the second conduit is positioned within the flared flange of the first conduit.

15. The assembly of claim 11, wherein:
the band includes a slot, and
the second conduit includes a retaining bracket configured to be positioned in the slot defined in the band.

16. The assembly of claim 10, wherein the retaining clip defines an opening, a portion of the band is positioned within the opening when the retaining clip is secured to the band.

17. The assembly of claim 10, further comprising a slot formed in the band, the slot being sized to receive the retaining clip, wherein the retaining clip is configured to be secured within the slot.

18. The assembly of claim 10, wherein the retaining clip defines an opening, and the outer wall of the attachment flange is positioned within the opening.

19. The assembly of claim 10, wherein:
the conduit is a first conduit, and
the band includes a second attachment flange and a second slot formed in the second attachment flange, the second slot being sized to receive a retaining bracket extending from a second conduit configured to be coupled to the first conduit.

20. A method of securing a clamp to a conduit, the method comprising:
positioning a band of the clamp over a conduit, and
sliding the band onto a flared flange extending radially outwardly from a cylindrical body of the conduit to position the flared flange within the band and to secure a retaining clip of the conduit to an attachment flange of the band, the attachment flange having an outer wall including a substantially flat surface positioned at a base of a channel defined in the band.

21. The method of claim 20, wherein the conduit is a first conduit, and the method further comprises retaining the clamp on the flared flange while positioning a flange of a second conduit in the flared flange of the first conduit.

22. The method of claim 21, further comprising advancing the band over a retaining bracket extending from the second conduit.

23. The method of claim 22, further comprising tightening a tensioning mechanism of the clamp after the flange of the second conduit is positioned within the flared flange of the first conduit to secure the first conduit to the second conduit.

24. The method of claim 20, further comprising positioning the attachment flange within an opening defined by the at least one retaining clip.

25. The method of claim 20, further comprising securing the retaining clip within a slot formed in the attachment flange.

* * * * *